(12) United States Patent
Boardman, IV et al.

(10) Patent No.: US 8,040,014 B2
(45) Date of Patent: Oct. 18, 2011

(54) STATOR CORE SUSPENSION AND RELATED SPRING BAR

(75) Inventors: William Hunter Boardman, IV, Burnt Hills, NY (US); Richard Nils Dawson, Voorheesville, NY (US); Nathaniel Philip Marshall, Clifton Park, NY (US); Anand Shankar Tanavde, Slingerlands, NY (US); David Raju Yamarthi, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/622,751

(22) Filed: Nov. 20, 2009

(65) Prior Publication Data

US 2011/0121680 A1    May 26, 2011

(51) Int. Cl.
*H02K 1/18* (2006.01)
*H02K 5/24* (2006.01)

(52) U.S. Cl. ............... 310/216.129; 310/432; 310/433

(58) Field of Classification Search ........... 310/216.129, 310/432–433, 427–428, 431, 258
See application file for complete search history.

(56) References Cited

U.S. PATENT DOCUMENTS

| | | | |
|---|---|---|---|
| 2,489,109 A | 11/1949 | Shildneck et al. | |
| 2,811,658 A | 10/1957 | Brainard | |
| 2,846,603 A * | 8/1958 | Webster et al. | 310/433 |
| 3,531,667 A * | 9/1970 | Barton et al. | 310/51 |
| 3,708,707 A * | 1/1973 | Kranz | 310/433 |
| 4,204,313 A | 5/1980 | Khutoretsky et al. | |
| 4,425,523 A * | 1/1984 | Detinko et al. | 310/433 |
| 4,469,973 A * | 9/1984 | Guyot et al. | 310/433 |
| 4,536,671 A | 8/1985 | Miller | |
| 4,634,909 A | 1/1987 | Brem | |
| 4,891,540 A | 1/1990 | Cooper et al. | |
| 5,875,540 A | 3/1999 | Sargeant et al. | |
| 6,104,116 A | 8/2000 | Fuller et al. | |
| 6,144,129 A * | 11/2000 | Fuller et al. | 310/91 |
| 6,321,439 B1 | 11/2001 | Berrong et al. | |
| 6,346,760 B1 | 2/2002 | Boardman, IV | |
| 6,498,417 B2 * | 12/2002 | Fuller | 310/216.113 |
| 6,628,027 B2 | 9/2003 | Fuller | |
| 6,720,699 B1 | 4/2004 | Shah et al. | |
| 7,202,587 B2 | 4/2007 | Sargeant et al. | |
| 7,397,163 B2 | 7/2008 | Cook et al. | |
| 7,714,477 B2 * | 5/2010 | Nagashima et al. | 310/216.129 |

FOREIGN PATENT DOCUMENTS

GB      2470467 A      11/2010

(Continued)

OTHER PUBLICATIONS

Great Britain Search Report issued in connection with GP Application No. GB1018954.6, Mar. 9, 2011.

(Continued)

*Primary Examiner* — Burton Mullins
(74) *Attorney, Agent, or Firm* — Hoffman Warnick LLC; Ernest G. Cusick (57) ABSTRACT

A stator core suspension includes a frame for supporting a stator core; a keybar coupled to a stator core section of the stator core; and a spring bar coupled to the frame and coupled to the keybar so as to be substantially aligned radially outboard of the keybar. A spring bar used in the stator core suspension may also include a substantially uniform cross-section throughout a length thereof, which may also be rectangular or round in cross-section.

11 Claims, 12 Drawing Sheets

FOREIGN PATENT DOCUMENTS

| | | | |
|---|---|---|---|
| JP | 55086348 A | | 6/1980 |
| JP | 61-49629 | * | 3/1986 |
| JP | 62260538 A | | 11/1987 |
| JP | 2007166726 A | | 6/2007 |
| WO | 00/57535 A1 | | 9/2000 |

OTHER PUBLICATIONS

Great Britian Patent Application No. 1018954.6, Search Report dated Aug. 4, 2011.

* cited by examiner

STATOR CORE SUSPENSION AND RELATED SPRING BAR

BACKGROUND

1. Technical Field

The disclosure relates generally to dynamoelectric machine suspension systems, and more particularly, to a spring bar stator core suspension system for a dynamoelectric machine.

2. Background Art

A stator core suspension for a dynamoelectric machine such as a generator or motor has to support the stator core and provide vibration isolation to the supporting structure (e.g., frame), which is mounted to the foundation. For example, large 2-pole generators may require vibration isolation to avoid shaking the foundation to such an extent that the anchorage will be compromised and environmental and health and safety (EHS) floor vibration limits may be exceeded.

Figure 1:
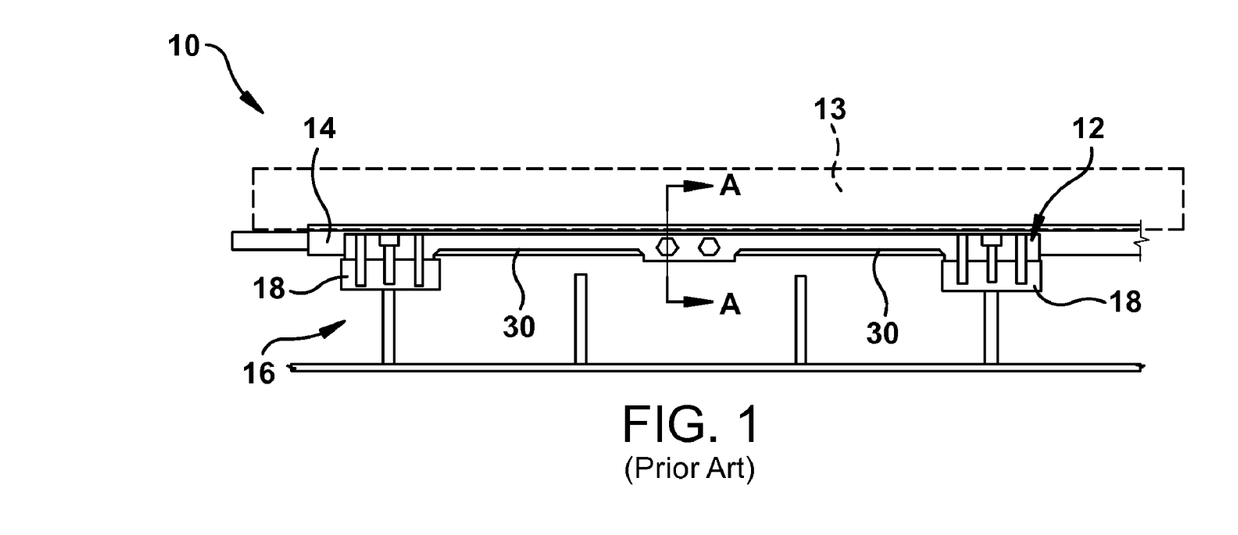
FIG. 1 shows a cross-sectional side view of a prior art stator core suspension.
Figure 2:
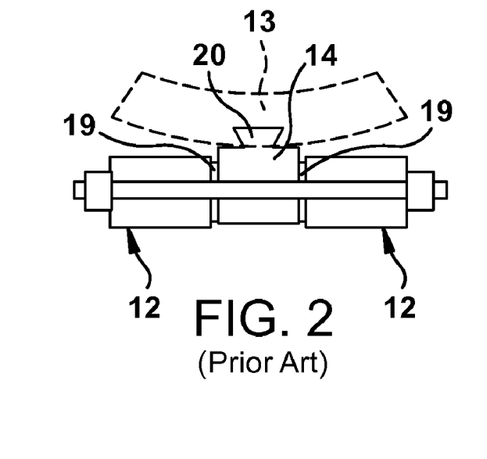
FIG. 2 shows a cross-sectional view along line A-A in FIG. 1.
Figure 3:
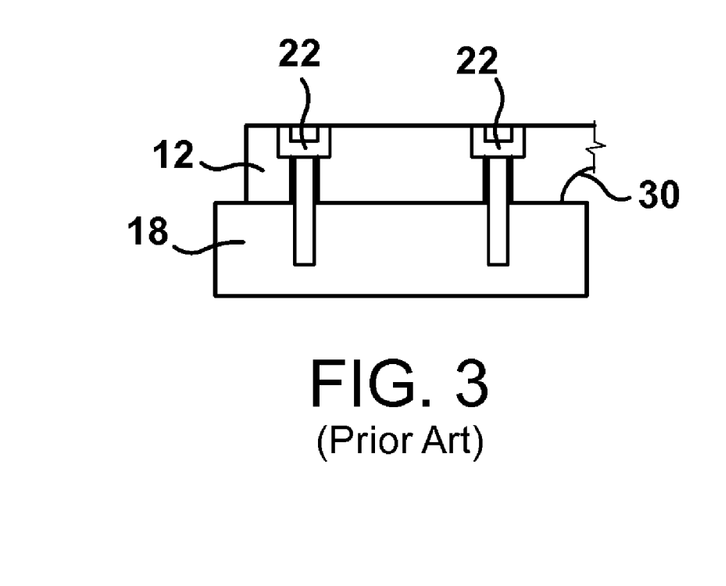
FIGS. 3 and 4 show details of the prior art stator core suspension of FIG. 1.
Figure 4:
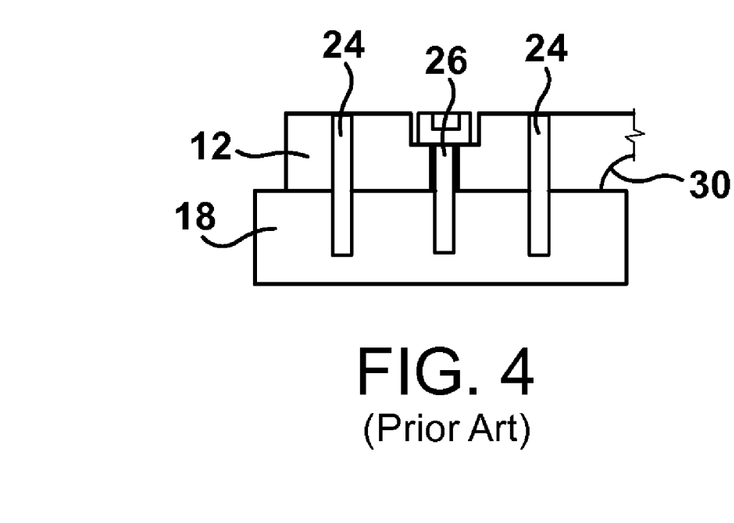

FIGS. 1-4 illustrate a conventional stator core suspension 10 including two spring bars 12 (see FIG. 2). FIG. 1 shows a cross-sectional side view, and FIG. 2 shows a cross-sectional view along line A-A in FIG. 1. As understood, a plurality of keybars 14 are provided that each couple to a respective stator core section 13 of a group of circumferentially spaced stator core sections 13 that make up the stator core. Keybars 14 are also mounted to a frame 16 via spring bars 12, which provide vibration isolation. As shown best in FIG. 2, spring bars 12 are bolted on each side of keybar 14 such that they are mounted circumferentially relative to a stator core section 13 (shown in phantom). As shown in FIG. 1, the suspension is coupled to a frame 16 after frame mounts (e.g., bore ring) 18 inside diameters have been machined to size. Keybar 14 dovetails 20 are then used (measured relative to one another) to locate the keybar-to-spring bar assembly and a bolt and dowel mounting holes are line drilled in frame mount 18. FIG. 2 depicts the current bolted suspension system keybar-to-spring bar attachment in which shims 19 between spring bars 12 and keybar 14 are sized to limit spring bar bending stress. FIGS. 3-4 show two common spring bar to frame mount arrangements used to date. As shown in FIG. 3, two shoulder bolts 22 mount spring bar 12 to frame mount 18, or as shown in FIG. 4, two dowels 24 with a single cap screw 26 for clamping between the dowels mounts spring bar 12 to frame mount 18.

As shown best in FIGS. 1, 3 and 4, the above-described suspensions require milling relief portions 30, i.e., changes in cross-sectional area, in spring bars 12 to allow for optimization of a bounce frequency and stiffness of spring bars 12. The milling process is expensive. In addition, conventional systems require milling frame mounts and drilling and tapping spring bar mounting holes into completed frame fabrications, which can only be done at a limited number of locations in the world. Consequently, the costs of the suspensions are high and the amount of machining required to mount them is extensive.

Welded spring bar suspension systems are relatively inexpensive but require special skill and expertise to allow for weld distortion and achieve keybar positions within specified tolerances. Some manufacturers have overcome this problem by machining the keybar dovetails after fabrication is completed, thereby eliminating weld distortion. However, few manufacturers have this machining capability.

BRIEF SUMMARY

A first aspect of the disclosure provides a stator core suspension comprising: a frame for supporting a stator core; a keybar coupled to a stator core section of the stator core; and a spring bar coupled to the frame and coupled to the keybar so as to be substantially aligned radially outboard of the keybar.

A second aspect of the disclosure provides a stator core suspension comprising: a frame for supporting a stator core; a keybar coupled to a stator core section of the stator core; and a spring bar coupled to the frame and coupled to the keybar, the spring bar having a substantially uniform, rectangular cross-section throughout a length thereof.

A third aspect of the disclosure provides a spring bar for a stator core suspension, the spring bar comprising: a length of material having a substantially uniform, rectangular cross-section, and including a first mount area for mounting to a keybar that is coupled to a stator core section and a second mount area for mounting to a frame mount of a frame that supports the stator core.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 5:
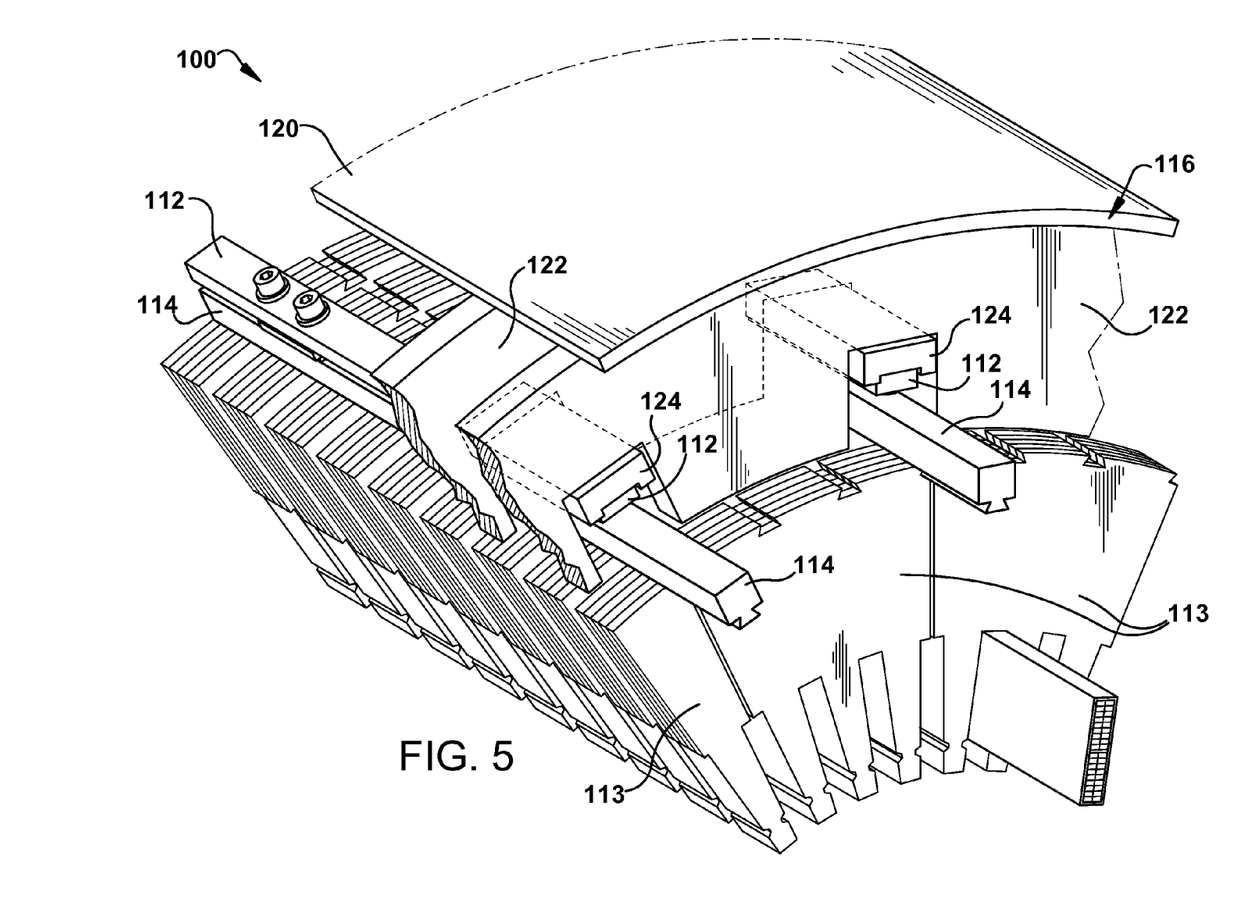
FIG. 5 shows a partial perspective view of one embodiment of a stator core suspension according to the present invention.

Referring to FIGS. 5-11, one embodiment of a stator core suspension 100 including a spring bar 112 is illustrated. A stator core constitutes part of a dynamoelectric machine such as a generator or motor, and, as shown in FIG. 5, includes a number of typically arcuate, stator core sections 113 that form the stator core. A rotor (not shown) is centrally positioned within the stator core to create the operational electromagnetic field that allows operation of the dynamoelectric machine. At least some of stator core sections 113 must be supported by a stator core suspension 100 to support the stator core as a whole and to isolate the stator core vibration from a foundation that supports the dynamoelectric machine.

Figure 6:
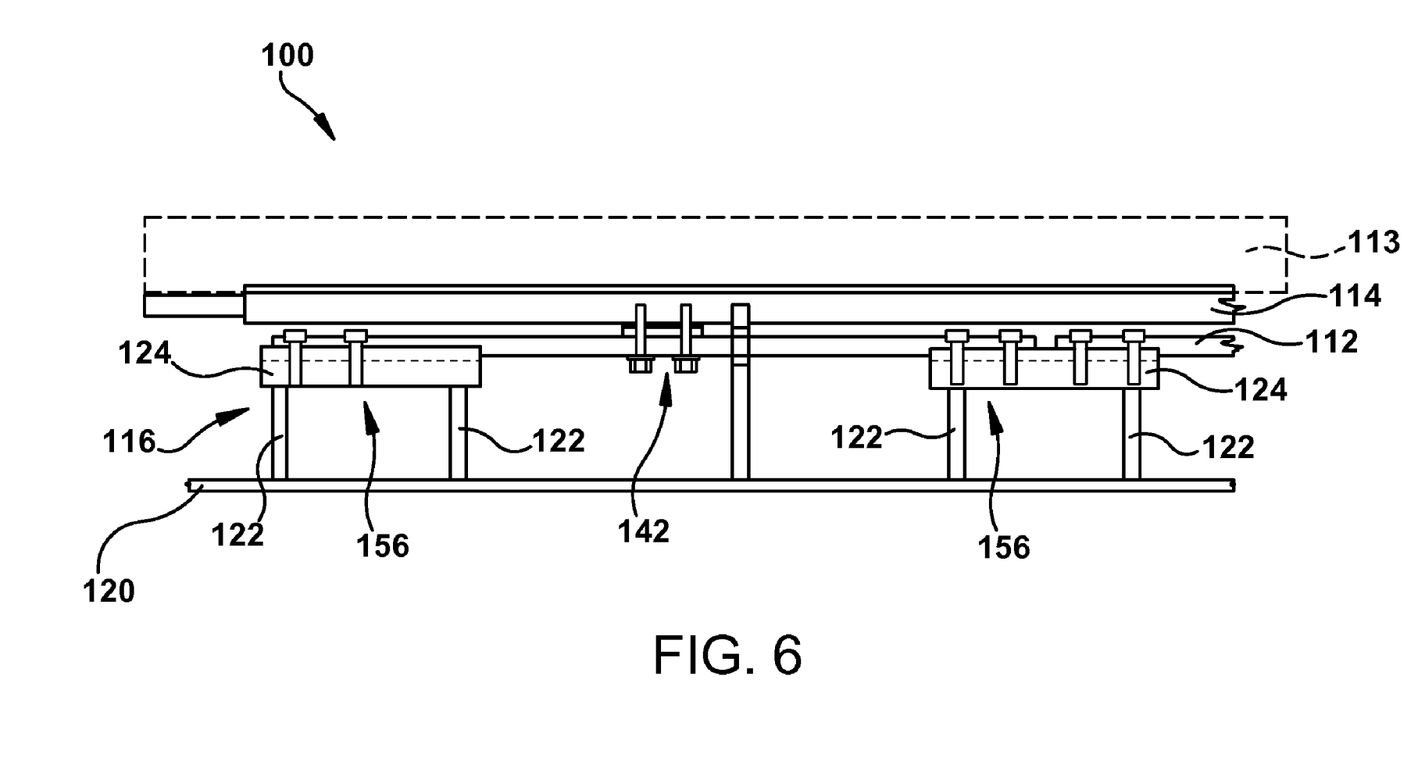
FIG. 6 shows a cross-sectional side view of one embodiment of a stator core suspension according to the present invention.
Figure 7:
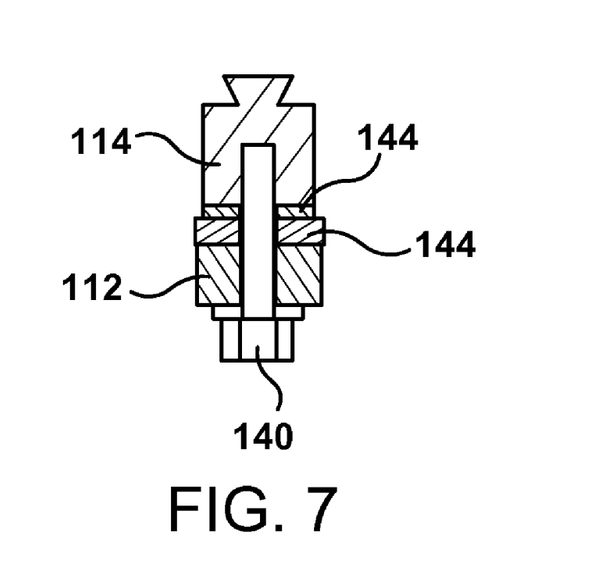
FIGS. 7 and 8 show a cross-sectional end view and a cross-sectional side view, respectively, of one embodiment of a spring bar and keybar mount area according to the present invention.

As shown best FIGS. 5 and 6, stator core suspension 100 includes a frame 116 for supporting a stator core, a keybar 114 (numerous sets shown) coupled to a stator core section 113 of the stator core, and a spring bar 112 coupled to frame 116 and coupled to keybar 114 so as to be (as best seen in FIG. 7) substantially aligned radially outboard of keybar 114. With regard to the term "radially outboard", as shown best in FIG. 7, it is understood that the stator core is a substantially circular structure in cross-section, and as keybar 114 is mounted to a stator core section 113 thereof, a radially outboard direction exists relative to the stator core as a whole.

Figure 19:
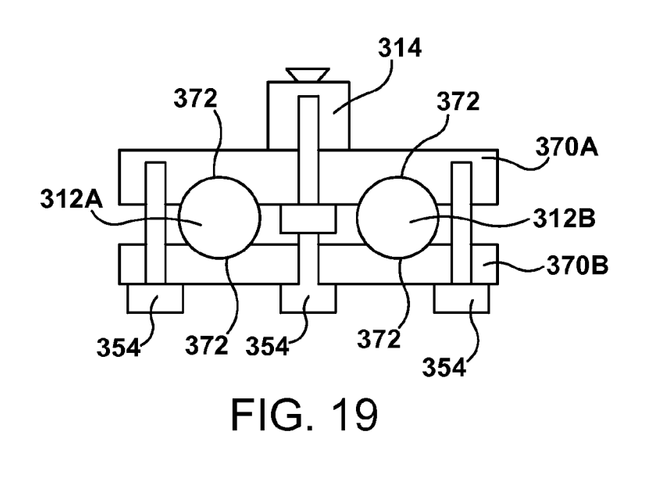
Figure 20:
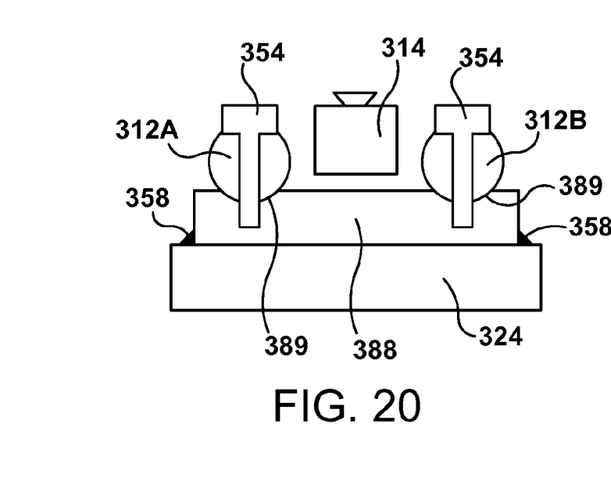
Figure 21:
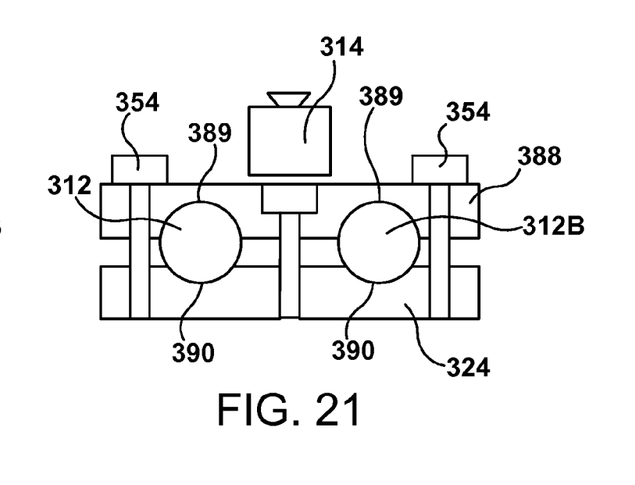

As also shown in FIGS. 5-7, in one embodiment, spring bar 112 has a substantially uniform cross-section throughout a length thereof. In one embodiment, spring bar 112 also has a substantially rectangular cross-section throughout a length thereof, i.e., it has a substantially uniform and rectangular cross-section throughout its length. In other embodiments, however, spring bar 112, while having a substantially uniform cross-section throughout its length, may have other shapes such as a square, a shape having a pair of parallel sides connected by sides that have other non-linear or segmented sides, etc. Further, FIGS. 19-21 illustrate embodiments in which spring bars 312A, 312B are substantially round. While shown as a pair, a single spring bar 312A or 312B may be applied similarly to the teachings of FIGS. 5-8. In any event, in contrast to conventional spring bars, spring bar 112 is devoid of any relief portions 30 (FIG. 1). Consequently, the spring bar(s) is less expensive to produce since the machining normally required to generate relief portions 30 (FIG. 1) is no longer necessary. Spring bar 112 and keybar 114 may be made of any suitable material such as ASME 4140 steel. Spring bar 112, as shown in FIG. 6 and as will be described herein, also includes one or more first mount areas 142 for mounting to keybar 114 (coupled to stator core section 113) and one or more second mount areas 156 for mounting to a frame mount 124 of frame 116 that supports the stator core.

Figure 8:
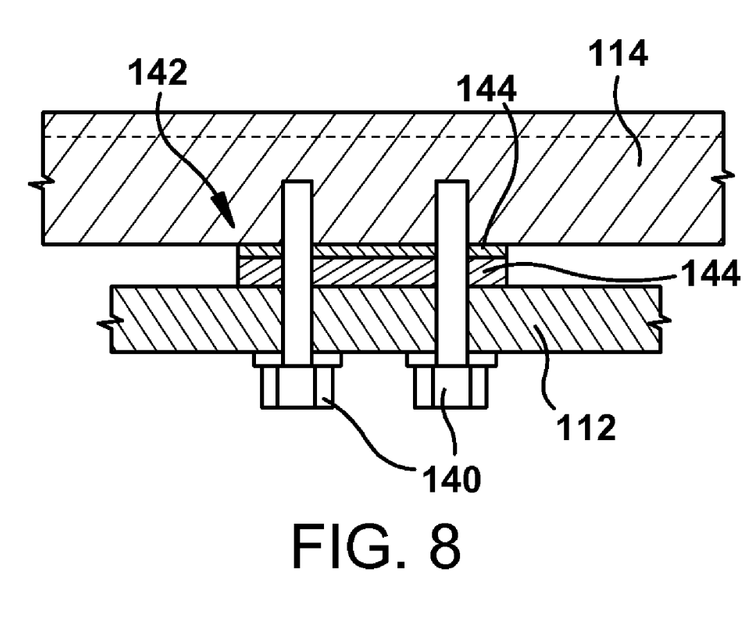

As shown in FIGS. 7 and 8, in one embodiment, spring bar 112 is bolted to keybar 114, e.g., using one or more bolts 140 at one or more first mount areas 142 along the length thereof. Sufficient clearance is provided between bolts 140 and spring bar 112 to prevent shear and allow for limited circumferential (lateral) adjustment. At least one spacer (or shim) 144 may be positioned between spring bar 112 and keybar 114 for radially positioning the spring bar relative to the keybar. Spacer(s) 144 may be sized to position spring bar 112 relative to keybar 114 to achieve, for example, alignment and/or a specific stiffness.

Spring bar 112 is coupled to frame 116, which includes a frame mount 124. Referring to FIGS. 6 and 9-11, frame 116 may also include any now known or later developed structure for coupling frame mount 124 to a foundation (not shown) of the dynamoelectric machine which includes the stator core. For example, frame 116 may include a frame wrapper 120 that couples to the foundation (not shown) and a plurality of frame section plates 122. Each frame section plate 122 positions a respective frame mount 124. As understood, frame section plates 122 extend at least partially around the stator core and are axially spaced along the stator core for transmitting loads from the stator core to the foundation.

Figure 9:
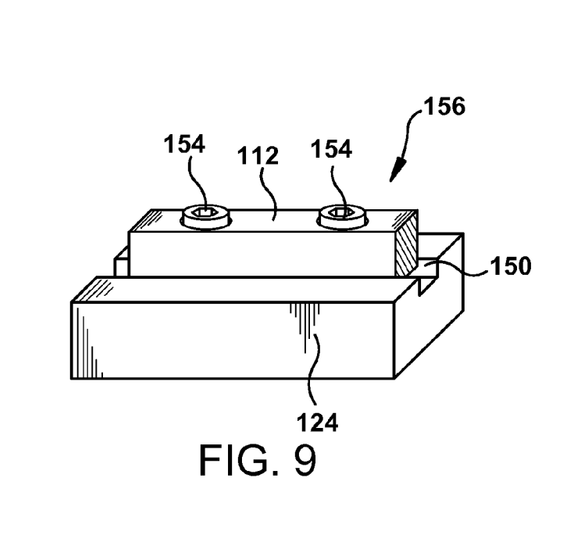
FIG. 9 shows a perspective side view of one embodiment of a spring bar and frame mount arrangement.
Figure 10:
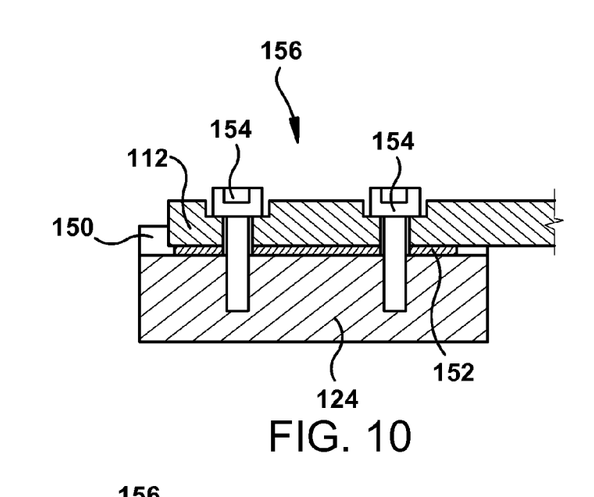
FIG. 10 shows a cross-sectional side view of another embodiment of a spring bar and frame mount arrangement.
Figure 11:
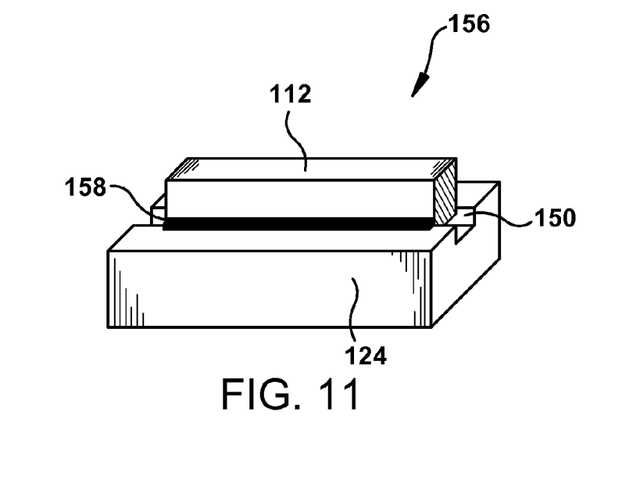
FIG. 11 shows a perspective side view of another embodiment of a spring bar and frame mount arrangement.

Referring to FIGS. 9-11, details of frame mount 124, which may also be referred to as a frame bore ring or pad, are illustrated. FIG. 9 shows a perspective side view, FIG. 10 shows a cross-sectional side view of one embodiment, and FIG. 11 shows a cross-sectional side view of another embodiment. In each embodiment, each frame mount 124 includes a groove 150 therein into which spring bar 112 sits. Groove 150 may be created in frame mount 124 in any fashion, e.g., machining, so as to accommodate the shape of spring bar 112 whatever it may be. Groove 150 positions spring bar 112 and, during operation, receives the torque shear load observed by spring bar 112, and prevents rotation of spring bar 112. As shown in FIG. 10, at least one spacer 152 may be positioned between spring bar 112 and frame mount 124 for separating and/or radially positioning the spring bar relative to the frame mount. As illustrated, in one embodiment, spring bar 112 is bolted to frame mount 124, e.g., by using one or more bolts 154 at one or more mount areas 156 at which frame mount 124 is provided. In FIG. 9, bolts 154 are provided in a fully counter-bored fashion in spring bar 112 to provide clearance for spring bar 112; and in FIG. 10, bolts 154 are only partially counter-bored in spring bar 112, and adequate clearance is provided to prevent shear. In another embodiment, shown in FIG. 11, spring bar 112 may be welded to frame mount 124 (see weld bead 158). In this case, spring bar 112 and frame mount 124 are made of welding-compatible materials, e.g., spring bar of ASME 4140 steel and frame mount 124 of ASME A36 steel or other suitable medium grade carbon steel.

Figure 12:
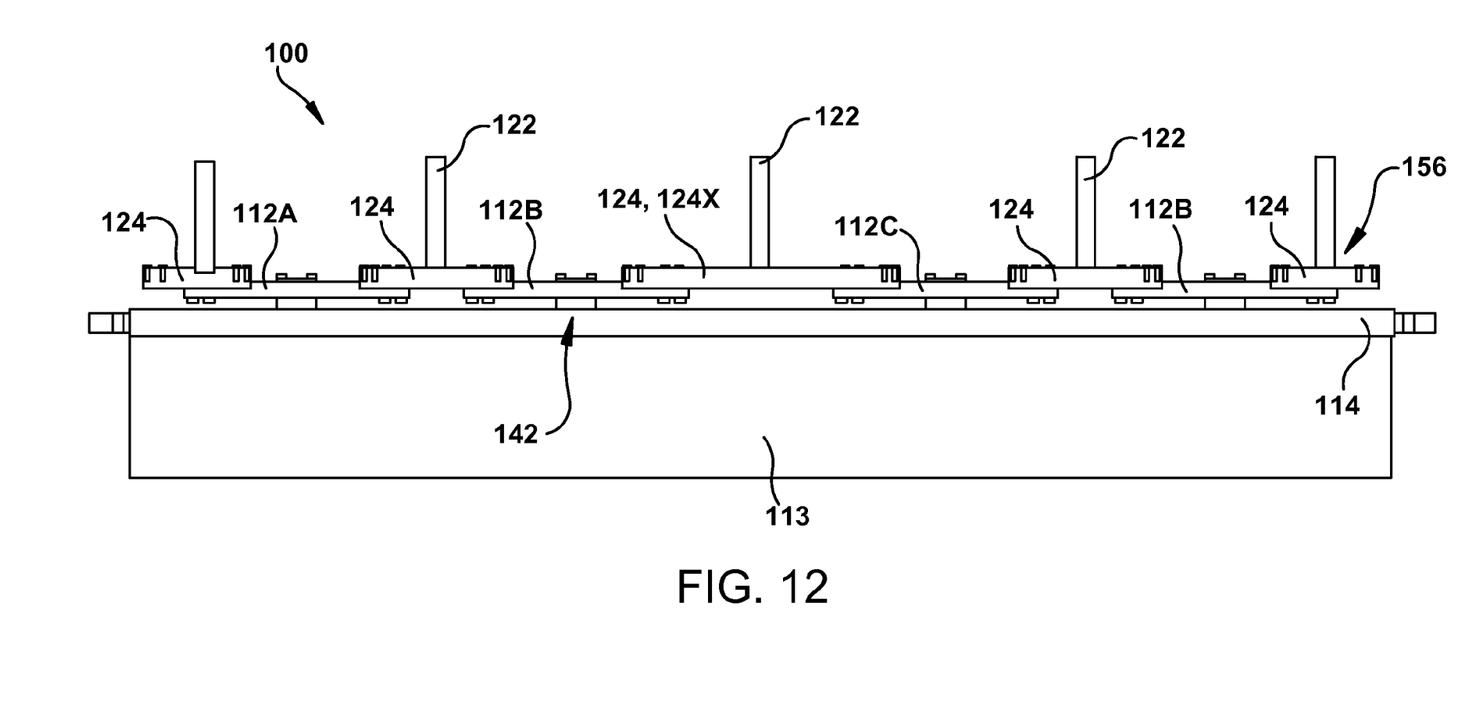
FIG. 12 shows a cross-sectional side view of another embodiment of a stator core suspension according to the present invention.

The above-described stator core suspension embodiments may also be replicated along a length of a key bar 114. FIG. 12 shows an example of this application in which a plurality of axially aligned spring bars 112A-D (four shown) coupled to frame 116 and coupled to keybar 114 are used. Details of frame 116 other than frame section plates 122 have been omitted from FIG. 12 for clarity. (Note: stator core sections 113 are on the bottom in this figure in contrast to FIG. 6 in which they are on top.) Each spring bar 112 is substantially aligned radially outboard of keybar 114. As illustrated, a given frame mount may mount more than one spring bar, e.g., frame mount 124X mounts spring bars 112B, 112C.

Figure 13:
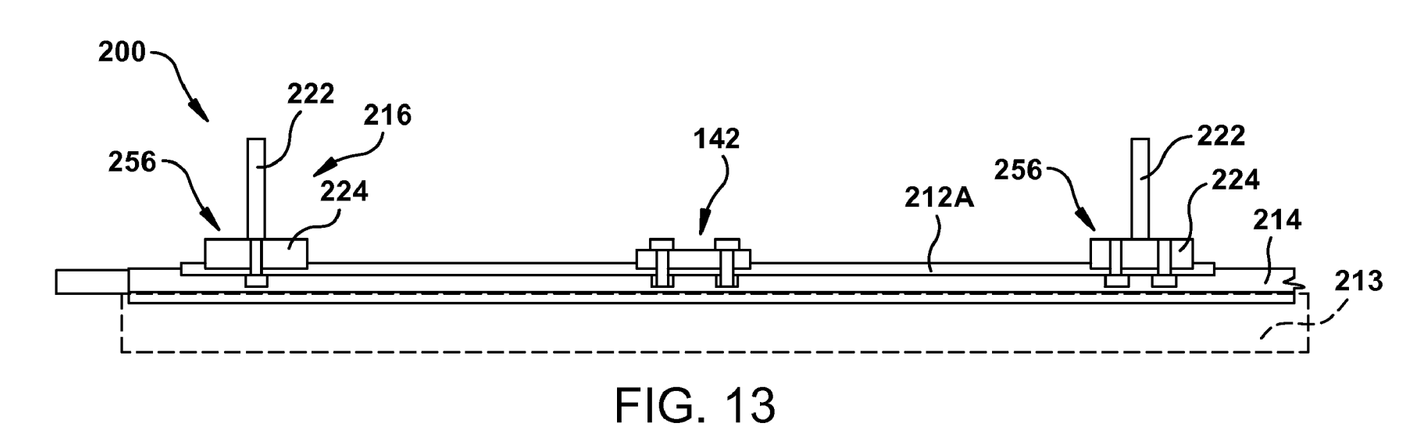
FIG. 13 shows a cross-sectional side view of an embodiment of a stator core suspension including a pair of spring bars according to the present invention.
Figure 14:
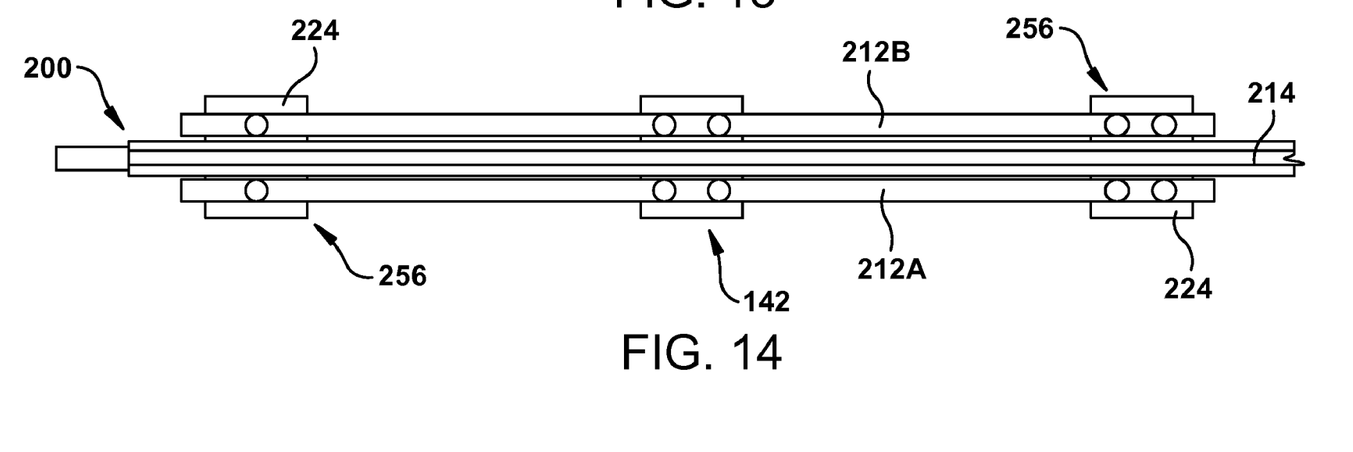
FIG. 14 shows a radial view of the FIG. 13 embodiment.

Turning to FIGS. 13-14, another embodiment of a stator core suspension 200 is illustrated that uses a pair of spring bars 212A, 212B, substantially similar to those described herein, extending substantially parallel to a keybar 214. FIG. 13 shows a cross-sectional side view, and FIG. 14 shows a radial view of stator core suspension 200. Each spring bar 212 is coupled to a frame 216 and coupled to keybar 214. For clarity, only frame mounts 224 and frame section plates 222 of frame 216 are shown.

Figure 15:
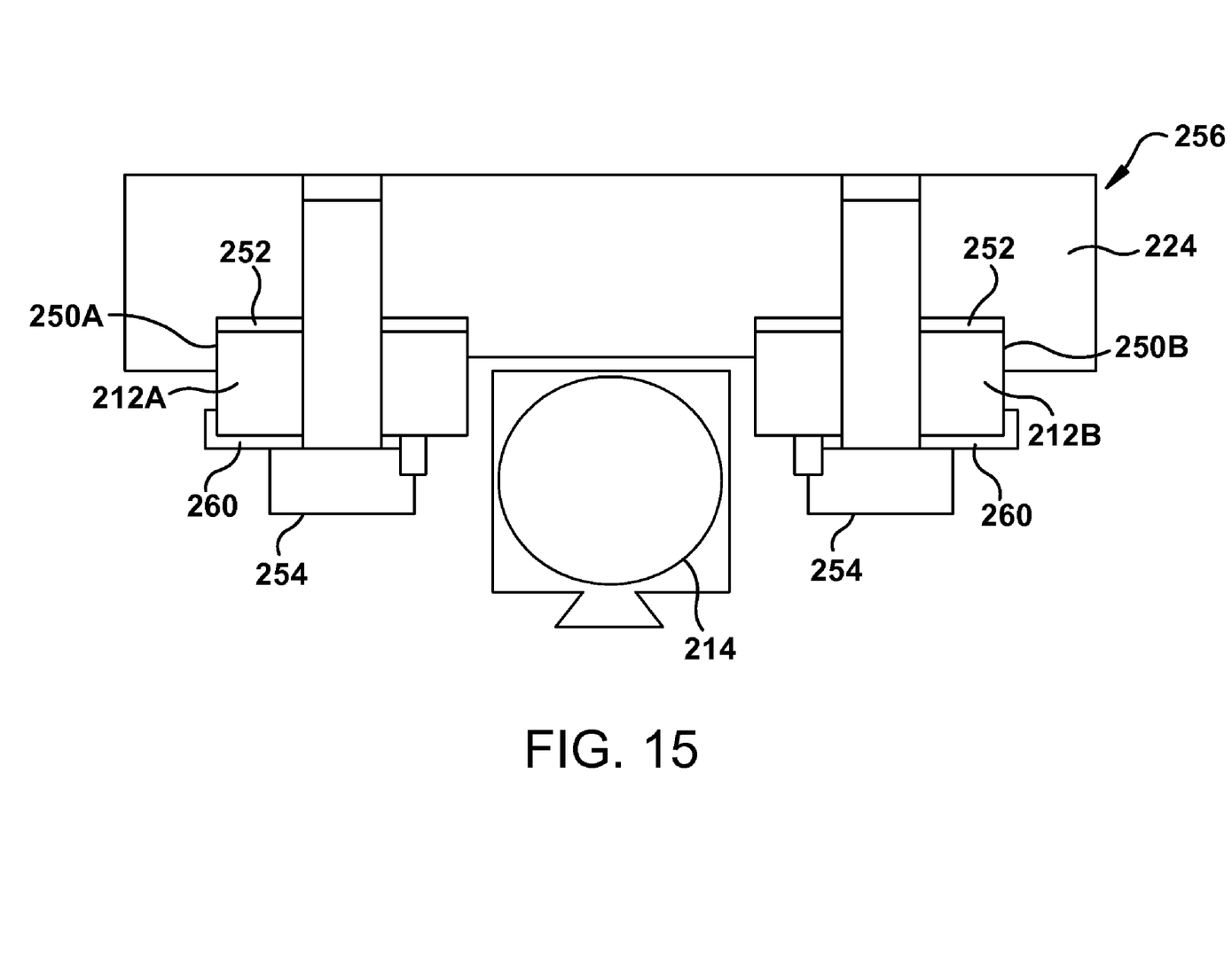
FIG. 15 shows a cross-sectional end view of one embodiment of the pair of spring bars and frame mount area according to the present invention.
Figure 16:
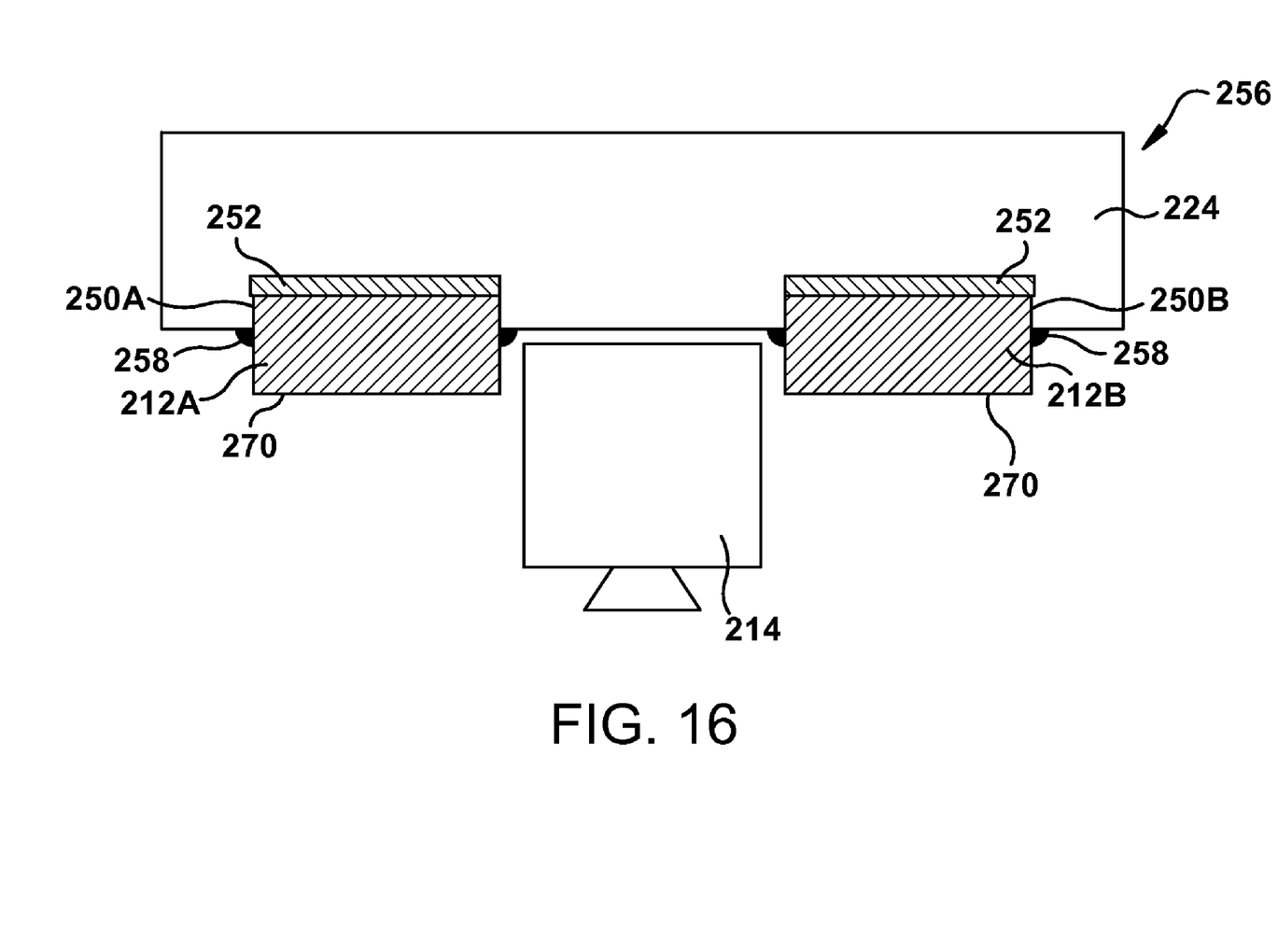
FIG. 16 shows a cross-sectional end view of another embodiment of the pair of spring bars and frame mount area according to the present invention.

FIG. 15 shows a cross-sectional view of one embodiment of spring bars 212A, 212B coupling to frame mount 224, i.e., at one or more mount areas 256 along spring bars 212A, 212B. In this case, frame mount 224 includes a first groove 250A therein into which one of the pair of spring bars 212A sits, and a second groove 250B therein into which the other one of the pair of spring bars 212B sits. Grooves 250A, 250B may be created in frame mount 224 in any fashion, e.g., machining, so as to accommodate the shape of spring bars 212A, 212B whatever they may be. Grooves 250A, 250B position a respective spring bar 212A, 212B and, during operation, receive the torque shear load observed by spring bars 212A, 212B, and prevents rotation of the spring bars. At least one spacer 252 may be positioned between spring bar 212A and/or 212B and frame mount 224 for separating and/or radially positioning the spring bars relative to the frame mount. As illustrated, in one embodiment, spring bars 212A, 212B are bolted to frame mount 224, e.g., by using one or more bolts 254 at one or more mount areas 256 at which frame mount 224 is provided. As illustrated, bolts 254 are only partially counter-bored fashion in spring bar and adequate clearance is provided to prevent shear. A lock plate 260, e.g., an angled washer, may be provided with each bolt 254 to assist in positioning spring bars 212A, 212B. However, bolts 254 may be implemented as described herein relative to FIG. 9, i.e., in a fully counter-bored fashion in the spring bars to provide clearance for the spring bars. Alternatively, as shown in FIG. 16, spring bars 212A, 212B may be welded to frame mount 224 (see weld bead 258). In this case, spring bars 212A, 212B and frame mount 224 are made of welding-compatible materials, e.g., spring bars of ASME 4140 steel and frame mount 224 of ASME A36 steel or other suitable medium grade carbon steel.

Figure 17:
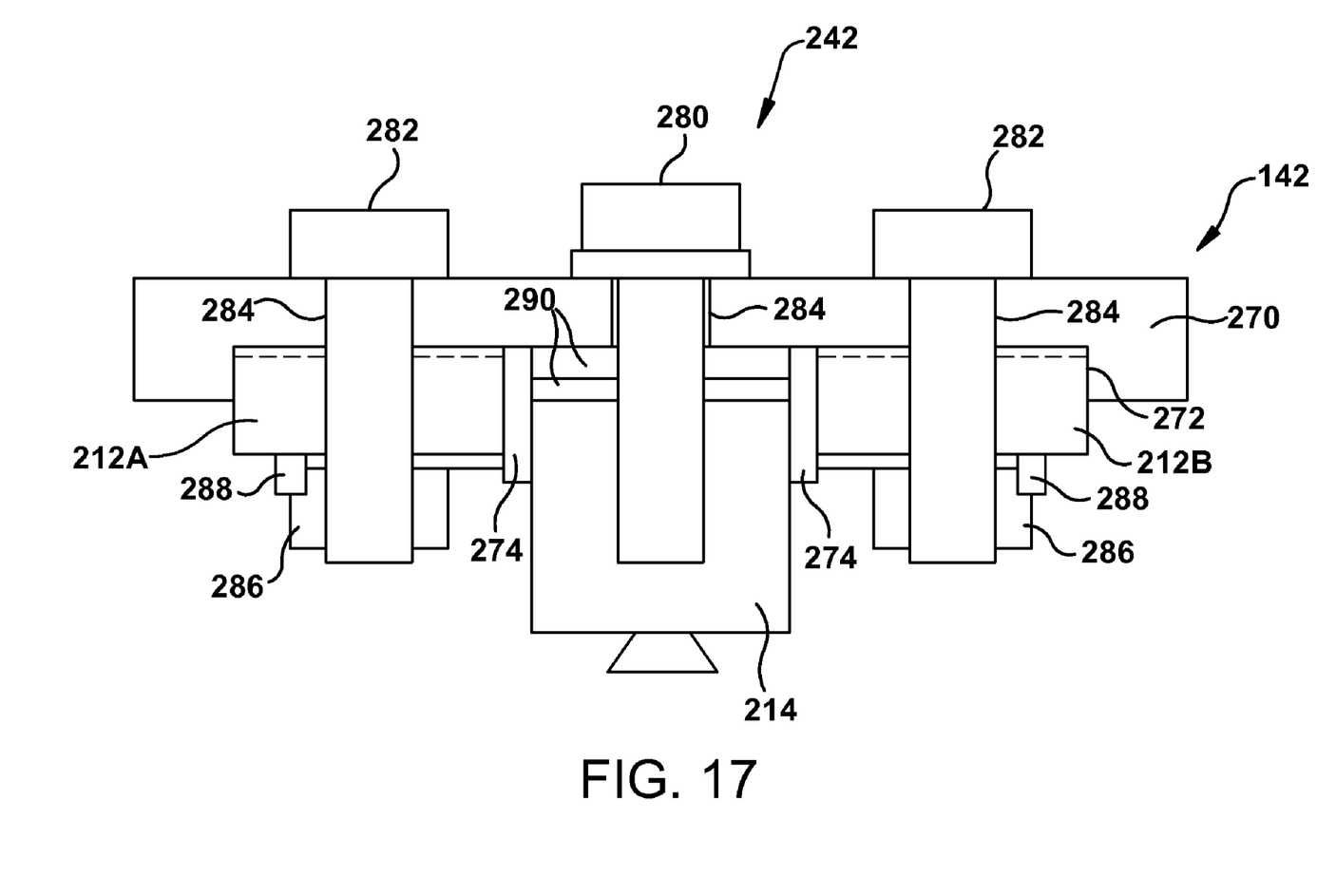
FIG. 17 shows a cross-sectional end view of one embodiment of the pair of spring bars and keybar mount area according to the present invention.

Turning to FIG. 17, a cross-sectional view of one embodiment of spring bars 212A, 212B coupling to key bar 214, i.e., at one or more mount areas 242 along spring bars 212A, 212B. In this case, a mounting plate 270 for mounting spring bars 212A, 212B relative to keybar 214 is provided. Mounting plate 270 may be made of the same material as frame mount 224 or another suitable metal. In one embodiment, mounting plate 270 includes a single groove 272 into which keybar 214 and spring bars 212A, 212B sit. In this case, mounting plate 270 may include one or more spacers 274 (two shown) between at least one of spring bars 212A, 212B and keybar 214 for lateral positioning the respective spring bar(s) relative to the keybar. Alternatively, where precision machining allows, shim(s) 274 may be omitted. In another alternative embodiment, a positioning groove 272 may provided for each spring bar and the keybar.

As illustrated, keybar 214 and spring bars 212A, 212B are bolted to mounting plate 270, e.g., using bolt 280 and bolts 282, respectively. As illustrated, openings 284 within mounting plate 270 for bolts 280, 282 may include appropriate clearance to prevent shear. In this embodiment, bolt 280 threadably connects to keybar 214, the latter of which includes an internally threaded bore. On contrast, bolts 282 threadably couple to nuts 286. A lock plate 288, e.g., an angled washer, may be provided with each bolt 282 to assist in positioning spring bars 212A, 212B. Spacer(s) 290 may be positioned between pair of spring bars 212A, 212B and mounting plate 270 (in phantom) and/or between keybar 214 and mounting plate 270 for radially positioning the spring bars and/or keybar.

Although not shown in this manner, the FIGS. 13-17 embodiment may allow reduction of the number of bolts to one at each end of spring bars 212A, 212B because the bolts do not carry the core loads and twisting of the spring bars is minimized because the radial compactness of the design as compared to the single spring bar embodiment (i.e., two spring bars on either side of the keybar are torsionally stiffer that one spring bar inline with the keybar). The FIGS. 13-17 embodiment may also be implemented as described relative to FIG. 12. That is, a plurality of pairs of spring bars 212A, 212B may be coupled to the frame and coupled to the keybar and axially aligned along their lengths. A given frame mount 224 (FIG. 15-16) or mounting plate 270 (FIG. 17) may mount more than one spring bar pair.

Figure 18:
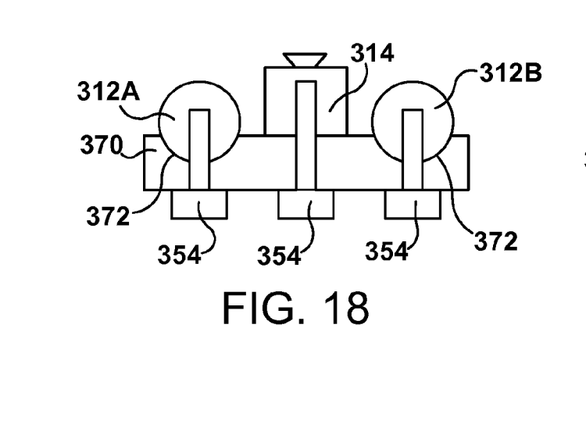
FIGS. 18-21 show cross-sectional views of alternative embodiments of a pair of spring bars that are substantially round according to the present invention.

Referring to FIGS. 18-21, cross-sectional views of another embodiment of spring bars 312A, 312B coupling to keybar 314, i.e., at one or more mount areas along spring bars 312A, 312B, and a frame mount 324 are illustrated. In this case, each spring bar 312A, 312B has a substantially round or circular cross-section. FIGS. 18 and 19 show embodiments for coupling keybar 314 to spring bars 312A, 312B. In this case, one or more mounting members 370, 370A, 370B for mounting spring bars 312A, 312B relative to keybar 314 is/are provided. Mounting member(s) 370, 370A, 370B may be made of the same material as frame mount 324 or another suitable metal. In all embodiments, each mounting member 370, 370A, 370B includes a pair of positioning grooves (seat or nest) 372 into which spring bars 312A, 312B sit. In FIG. 19, a single mounting member 370 is used, and a number of bolts 354 threadably couple directly into keybar 314 and spring bars 312A, 312B. In FIG. 20, a pair of mounting members 370A, 370B are used, and a number of bolts 354 threadably couple directly to keybar 314 and mounting members 370A, 370B to clamp spring bars 312A, 312B in position.

FIGS. 20 and 21 illustrate coupling spring bars 312A, 312B to a frame mount 324. As illustrated, spring bars 312A, 312B are bolted to frame mount 324 by a positioning member 388, e.g., using bolts 354, which includes a pair of positioning grooves (seat or nest) 389 into which spring bars 312A, 312B sit. Positioning member 388 may be made of the same material as frame mount 324 or another suitable metal. FIG. 20 shows an embodiment in which positioning member 388 is welded (by welds 358) to frame mount 324, and bolts threadably couple spring bars 312A, 312B to positioning plate 388. In this case, positioning grooves 389 include threaded openings or receptacles for threadably receiving bolts 354. FIG. 21 shows an embodiment in which positioning member 388 is on one side of spring bars 312A, 312B and frame mount 324 is on the other side. Here, frame mount 324 includes a pair of positioning grooves (seat or nest) 390 into which spring bars 312A, 312B sit. Positioning grooves 390 are positioned in such a way as to complement positioning grooves 389 in positioning member 388. Here, bolts 354 threadably couple to frame mount 324 to clamp spring bars 312A, 312B with positioning member 388 and in positioning grooves 389 and 390, to hold them fixed relative to frame mount 324. While substantially round spring bars 312A, 312B have been illustrated in an embodiment including a pair of spring bars, it is understood that a single substantially round spring bar may also be employed relative to the teachings of FIGS. 5-8 with the respective mounting systems modified to include appropriate positioning grooves, as in FIGS. 18-21.

While two parallel spring bars 212A, 212B (or 312A, 312B) have been illustrated, the number of parallel bars is not limited to that number. That is, more than two parallel spring bars may be employed. In this case, the mountings may be adjusted to allow appropriate connection and support of the additional spring bars.

Although particular mounting mechanisms have been described herein, it is understood that a large variety of different mechanisms may be employed for coupling keybars, spring bars and frame mounts, and all are considered within the scope of the invention. For example, bolted joints may take a variety of different forms than that shown. Further, joints may be welded or the mounting structures altered to take on a clamping form instead of direct connection.

The above-described embodiments provide improved maintenance of keybar alignment and straightness. In addition, the bolted designs allow for keybar radial location adjustment by use of spacers at bolted mount areas. In this fashion, keybar dovetail locations can be adjusted at the last minute, e.g., during stacking if necessary without contamination associated with welded keybars. Furthermore, the above-described embodiments avoid weld stresses associated with use of compression bands with welded core and support rings. The embodiments described also reduce costs by using low cost bolting arrangements and removing the need for machining relief portions in the spring bars, thus simplifying frame fabrication and construction and reducing cycle times to produce the suspension. Also, the embodiments offer flexibility to achieve any vibration isolation ratio and bounce frequency desired by, for example, adjusting spacers used with the spring bars, adjusting the length of spring bars or adjusting the number of spring bars used (either circumferentially or axially). Further, keybar rattle is minimized by providing various degrees of freedom to adjust the keybar.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A stator core suspension comprising:
a frame for supporting a stator core;
a keybar coupled to a stator core section of the stator core; and
a spring bar coupled to the frame and coupled to the keybar so as to be substantially aligned radially outboard of the keybar,
wherein the spring bar has a substantially circular cross section,
wherein the substantially circular cross section is substantially uniform across an axial length of the spring bar,
wherein the spring bar includes a pair of spring bars extending substantially parallel to the keybar, each spring bar coupled to the frame and coupled to the keybar, and
wherein the frame includes a frame mount including a first groove therein into which one of the pair of spring bars sits, and a second groove therein into which the other one of the pair of spring bars sits.

2. The stator core suspension of claim 1, further comprising a pair of spacers, respectively between the pair of spring bars and the frame mount.

3. The stator core suspension of claim 1, wherein the pair of spring bars are bolted to the frame mount.

4. The stator core suspension of claim 1, wherein the pair of spring bars are bolted to the keybar.

5. The stator core suspension of claim 1, further comprising at least one spacer between pair of spring bars and the keybar.

6. A stator core suspension comprising:
a frame for supporting a stator core;
a keybar coupled to a stator core section of the stator core; and
a spring bar coupled to the frame and coupled to the keybar, the spring bar having a substantially uniform cross-section throughout an axial length thereof,
wherein the substantially uniform cross-section is one of a substantially rectangular cross-section or a substantially circular cross-section,
wherein the spring bar includes a pair of spring bars extending substantially parallel to the keybar, each spring bar coupled to the frame and coupled to the keybar, and
wherein the frame includes a frame mount including a first groove therein into which one of the pair of spring bars sits, and a second groove therein into which the other one of the pair of spring bars sits.

7. The stator core suspension of claim 6, wherein each of the pair of spring bars is respectively to the keybar so as to be substantially aligned radially outboard of the keybar.

8. The stator core suspension of claim 6, wherein the pair of spring bars are bolted to the frame mount, and further comprising a lock plate between a bolt and a respective spring bar for laterally positioning the spring bar relative to the frame mount.

9. The stator core suspension of claim 6, wherein the pair of spring bars are welded to the frame mount.

10. The stator core suspension of claim 6, further comprising a mounting plate for mounting the pair of spring bars relative to the keybar, the mounting plate including a spacer between at least one of the pair of spring bars and the keybar for radially adjusting the at least one spring bar relative to the keybar.

11. The stator core suspension of claim 10, further comprising at least one spacer between at least one of the keybar and at least one of the pair of spring bars and the mounting plate, the at least one spacer configured to radially adjust a position of at least one of the pair of spring bars.

* * * * *